US008626698B1

(12) United States Patent
Nikolaev et al.

(10) Patent No.: US 8,626,698 B1
(45) Date of Patent: Jan. 7, 2014

(54) METHOD AND SYSTEM FOR DETERMINING PROBABILITY OF PROJECT SUCCESS

(71) Applicant: FMR LLC, Boston, MA (US)

(72) Inventors: Igor Nikolaev, Galway (IE); Dmitry Bisikalo, Chestnut Hill, MA (US); Tom Mulligan, Co. Galway (IE)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/740,822

(22) Filed: Jan. 14, 2013

(51) Int. Cl.
*G06F 17/00* (2006.01)
*G06N 5/02* (2006.01)

(52) U.S. Cl.
USPC .................................. 706/50; 706/21; 705/10

(58) Field of Classification Search
None
See application file for complete search history.

(56) References Cited

U.S. PATENT DOCUMENTS

| 7,366,680 | B1 * | 4/2008 | Creel et al. ................... 705/7.17 |
| 8,160,977 | B2 | 4/2012 | Poulin |
| 2008/0154821 | A1 * | 6/2008 | Poulin .............................. 706/21 |
| 2012/0072260 | A1 * | 3/2012 | Graham et al. .............. 705/7.32 |

OTHER PUBLICATIONS

Theory and Methodology Project management with time, cost, and quality considerations A.J.G. Babu, Nalina Suresh , W. Paul Stillman School of Business, Seton Hall University, South Orange, NJ 07079-2692, USA, University of Wisconson-Eau Claire, W! 54702, USA, Journal of Operational Research 88 (1996) 320-327.*

"The Elements of Project Risk Management," http://www.netcomuk.co.uk/~rtuslker/project/elements.html. (Published prior to Jan. 14, 2013) (3 pages).
"Failure Probabilities from Quality Control Charts," Wolfram Demonstrations Project: Failure Probabilities from Quality Control Charts; http://demonstrations.wolfram.com/FailureProbailitiesFromQualityControlCharts. (Published prior to Jan. 14, 2013) (2 pages).
"Kokteyl," http://www.kokteyl.com/eng/iszekasi-about.html, (Published prior to Jan. 14, 2013) (1 page).
"Reducing Project Costs and the Probability of Project Failure," by TheSuccessMemo, http://www.successmemo.com/?p=322, Dec. 6, 2010, (Published prior to Jan. 14, 2013) (5 pages).
"Why Do Projects Fail? Learning How to Avoid Project Failure," Project Management Training from MindTools.com, http://www.mindtools.com/pages/article/newPPM_58.htm (Published prior to Jan. 14, 2013) (3 pages).
Frese, Robert, "Project Success and Failure: What is Success, What is Failure, and How Can You Improve Your Odds for Success?," http://www.umsl.edu/~sauterv/analysis/6840_f03_papers/frese/ Dec. 16, 2003 (12 pages).

(Continued)

*Primary Examiner* — Kakali Chaki
*Assistant Examiner* — Luis Sitiriche
(74) *Attorney, Agent, or Firm* — Proskauer Rose LLP

(57) ABSTRACT

A computer-implemented method is provided for developing a model to estimate a probability of project success. The method includes maintaining a database of historical project management performance data including i) task information associated with at least one completed task and ii) member information associated with at least one team member. The method includes forming a predictive model based on the historical project management performance data. Forming a predictive model further includes formulating probability distributions to characterize one or more dependency relationships in the predictive model. Each probability distribution includes at least one probability determined based on the historical project management performance data.

12 Claims, 6 Drawing Sheets

(56) References Cited

OTHER PUBLICATIONS

Gifford, Will Duckett, "Risk Analysis and the Acceptable Probability of Failure," Risk Analysis, Jul. 2004 (5 pages).

Saputra et al, "Project Reliability: Probability of a Project Meets its Quality-Cost-Time Target Under Uncertainty," International Journal of Electronic Business Management, vol. 9, No. 3, pp. 220-230 (2011), (11 pages).

Eugene Charniak, "Bayesian Networks Without Tears," The American Association for Artificial Intelligence, 1991, (15 pages) http://www.cs.ubc.ca/~murphyk/Charniak_91.pdf.

Kevin Murphy, "A Brief Introduction to Graphical Models and Bayesian Networks," 1998, (21 pages) http://www.cs.ubc.ca/~murphyk/Bayes/bnintro.html.

"Graphical Model," http://en.wikipedia.org/wiki/Graphical_model, Jan. 11, 2013, (4 pages).

\* cited by examiner

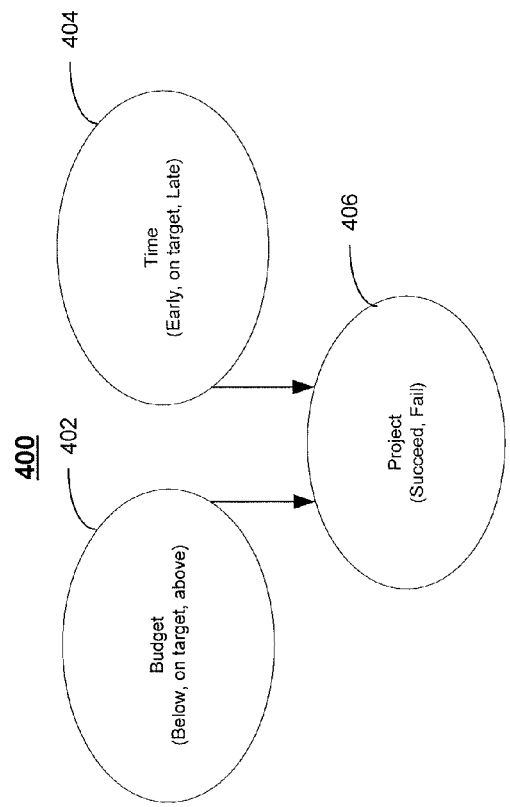

| Project | Budget | Time | CPD |
|---|---|---|---|
| Success | Below (<90%) | Early Delivery (<90%) | 0.9 |
| Failure | Below (<90%) | Early Delivery (<90%) | 0.1 |
| Success | On Target (90-110%) | Early Delivery (<90%) | 0.8 |
| Failure | On Target (90-110%) | Early Delivery (<90%) | 0.2 |
| Success | Above (>110%) | Early Delivery (<90%) | 0.7 |
| Failure | Above (>110%) | Early Delivery (<90%) | 0.3 |
| Success | Below (<90%) | On Target Delivery (90-) | 0.6 |
| Failure | Below (<90%) | On Target Delivery (90-) | 0.4 |
| Success | On Target (90-110%) | On Target Delivery (90-) | 0.5 |
| Failure | On Target (90-110%) | On Target Delivery (90-) | 0.5 |
| Success | Above (>110%) | On Target Delivery (90-) | 0.4 |
| Failure | Above (>110%) | On Target Delivery (90-) | 0.6 |
| Success | Below (<90%) | Late Delivery (>110%) | 0.3 |
| Failure | Below (<90%) | Late Delivery (>110%) | 0.7 |
| Success | On Target (90-110%) | Late Delivery (>110%) | 0.2 |
| Failure | On Target (90-110%) | Late Delivery (>110%) | 0.8 |
| Success | Above (>110%) | Late Delivery (>110%) | 0.1 |
| Failure | Above (>110%) | Late Delivery (>110%) | 0.9 |

FIG. 4

METHOD AND SYSTEM FOR DETERMINING PROBABILITY OF PROJECT SUCCESS

FIELD OF THE INVENTION

The invention relates generally to computer-implemented methods and apparatuses, including computer program products, for developing a computerized model to estimate probability of project success, and more particularly, to developing a predictive model based on historical project management performance data.

BACKGROUND OF THE INVENTION

Project management involves, in part, planning, organizing, securing and/or managing resources to bring about the successful completion of a project with respect to specific project goals and objectives. Typically, it is difficult for a project manager to determine the likelihood of success of a project prior to or during its execution. This is because a real-life project is subjected to various subjective and objective constraints, many of which have unknown effects on the ultimate success of the project. However, failure to manage uncertainties and misconception about the likelihood of success of a project can potentially produce disastrous consequences, such as revenue loss, strained relationships with customers, and adverse impact on employee performance.

SUMMARY OF THE INVENTION

Therefore, a predictive model is needed to accurately estimate the probability of success of a project that is subjected to one or more constraints, including resource and/or scheduling constraints. The predictive model can be developed using artificial intelligence/machine learning techniques, such as probabilistic graphical modeling (PGM) methods. A PGM method is an analytical approach that combines probability theory and graph theory to model processes with complex uncertainties, while accounting for expert knowledge in the field. A PGM method can produce a model by defining processes in terms of random variables and relationships among the variables.

In one aspect, a computer-implemented method is provided for developing a model to estimate a probability of project success. The method includes maintaining, by a computing device, a database of historical project management performance data including i) task information associated with at least one completed task and ii) member information associated with at least one team member. The method includes forming, by the computing device, a predictive model based on the historical project management performance data. Forming the predictive model further includes determining, by the computing device, a plurality of variables, including a variable representing a probability of project success, estimating, by the computing device, dependency relationships among the variables, and formulating, by the computing device, a probability distribution for each variable to characterize one or more dependency relationships associated with the variable. Each probability distribution includes at least one probability corresponding to a state of the variable determined based on the historical project management performance data.

In another aspect, a computer program product, tangibly embodied in a non-transitory machine-readable storage device, is provided for developing a model to estimate a probability of project success. The computer program product includes instructions being operable to cause data processing apparatus to maintain a database of historical project management performance data including i) task information associated with at least one completed task and ii) member information associated with at least one team member. The computer program product also includes instructions being operable to cause data processing apparatus to form a predictive model based on the historical project management performance data. The instructions that cause the data processing apparatus to form the predictive model further instructions that cause the data processing apparatus to determine a plurality of variables, including a variable representing a probability of project success, estimate dependency relationships among the variables, and formulate, for each variable, a probability distribution to characterize one or more dependency relationships associated with the variable. Each probability distribution includes at least one probability corresponding to a state of the variable computed based on the historical project management performance data.

In other examples, any of the aspects above can include one or more of the following features. In some embodiments, information is received from a user defining a project and a probability of project success is calculated for the project by applying the received information to the predictive model. In some embodiments, based on the received information, a value is defined for at least one of the variables of the predictive model. The probability of project success for the new project can be calculated subject to the value defined for the at least one variable.

In some embodiments, new historical project management performance data is received from a user. In response, the predictive model is refined using the new historical project management performance data by altering at least one of the variables, dependency relationships or conditional distributions.

In some embodiments, the member information includes at least one of an education level, experience level or skill level of the at least one team member. In some embodiments, the task information includes a complexity level of the at least one completed task.

In some embodiments, the plurality of variables include a scope variable representing a scope of tasks executable in a project, a resource variable representing an amount of resources available to a project, a delivery time variable representing a time limit for completing a project, a finances variable representing an amount of financial resources available to a project, and a non-labor resource variable representing an amount of non-labor resources available to a project. In some embodiments, the variable presenting a probability of project success is conditionally dependent on at least one of the scope, resource, delivery time, finances or non-labor resource variable.

In some embodiments, the predictive model is generated using a probabilistic graphical modeling technique including one of a Bayesian algorithm, Markov rule-based algorithm, neural network algorithm, or genetic algorithm.

In some embodiments, systems and methods of the present invention are implemented in a computer network environment. The network environment can include at least one user device communicating with a server via an IP network. A prediction system can reside on the server and accessible to a user over the IP network via the user device. In some embodiments, the prediction system is a stand-alone module residing the user device and is accessible to the user without the IP network.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

FIG. 4 shows an example for predicting the success of a project using the process of FIG. 1.

DESCRIPTION OF THE INVENTION

Figure 1:
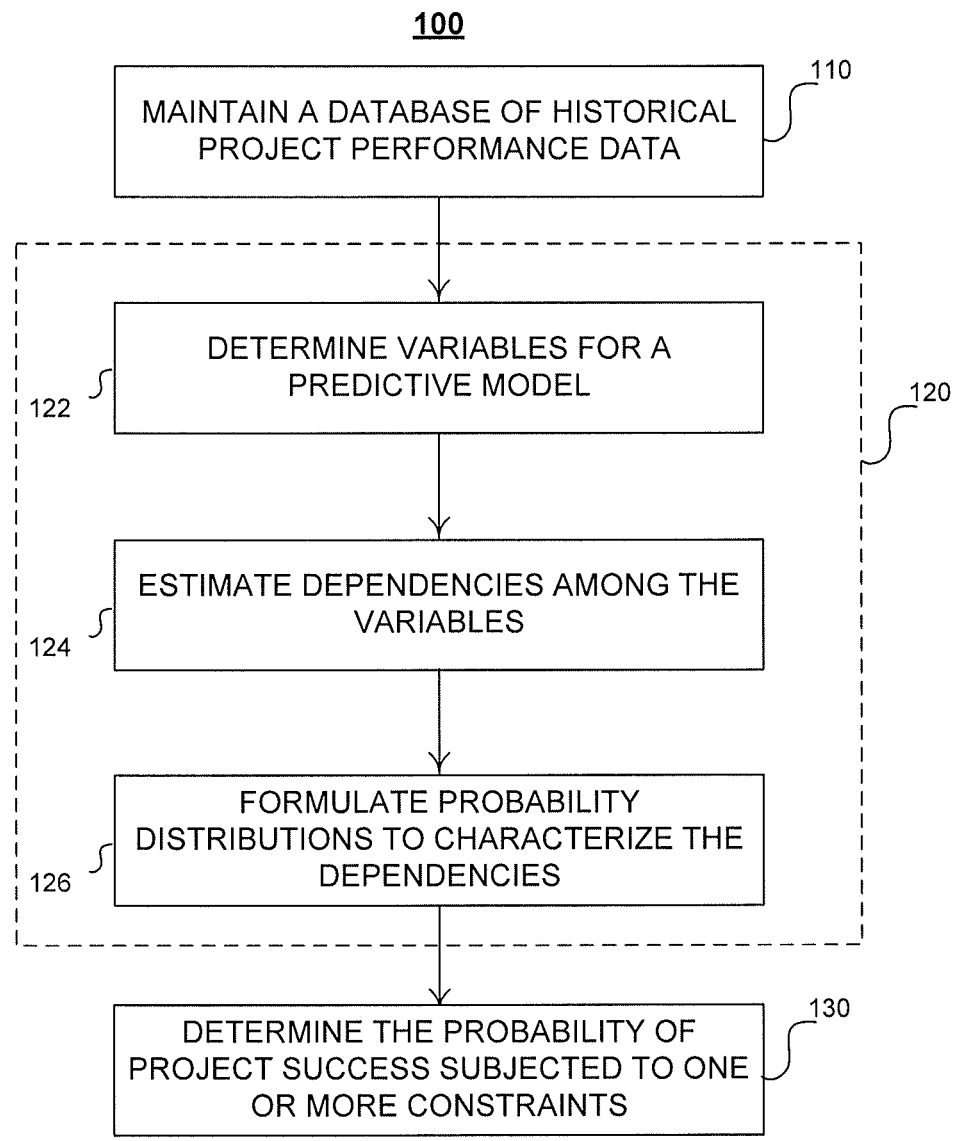
FIG. 1 illustrates an exemplary flowchart depicting general process flow for constructing and using a predictive model.

FIG. 1 illustrates a flowchart 100 depicting general process flow for constructing a predictive model and using the model to predict whether a new or in-flight project can be successfully completed. The elements of flowchart 100 are described using the exemplary prediction system 500 of FIG. 5. The process can include maintaining a database of historical project performance data (step 110), generating the predictive model based on the database of historical project performance data (step 120), and determining the probability of success of a new project based on the predictive model (step 130). Generating the predictive model (step 120) can further include determining variables to include in the model (step 122), estimating dependencies among the variables (step 124), and formulating probability distributions to characterize the dependencies (step 126).

A project is an activity that includes at least a starting date and requires one or more resources to carry out such activity. Projects can range from simple activities to complex activities. Simple activities can vary from, for example, creating a web page to repairing a piece of equipment. Resources associated with these simple projects can include an HTML programmer and access to a computer for creating the web page, or a mechanic, necessary tools, and a workshop for repairing the piece of equipment. In contrast, complex activities can vary from, for example, creating a 401(K) program for a large company to constructing a large skyscraper. The resources for complex projects can easily number in the hundreds or thousands. In some embodiments, a project can be decomposed into two or more tasks that are completed in a sequential order.

Historical project performance data maintained in a database of the prediction system 500 (step 110) can include data related to one or more completed projects. The data can be stored in data structures such as textual lists, XML documents, class objects (e.g., instances of C++ or Java classes), other data structures, or any combination thereof. Performance data related to a completed project can be divided into multiple categories. The data can include at least one of scope information, resource information, schedule information, cost information, profitability information, or criticality information, or any combination thereof.

Scope information for a project can identify one or more tasks delivered by the project. Using the web page project discussed above as an example, scope information for the project can include a description of the web page made or additional software modules developed in support of the web page. In some embodiments, for each completed task of a project, scope information can include data indicating the complexity level of the task, employee skill requirement for the task, etc.

Resource information for a completed project can identify a plurality of resources that were consumed by the project. These resources can range from human personnel (e.g., computer programmers, accountants, employees, consultants, etc.) to physical resources (e.g., a computer resources, infrastructure resources such as a geographic locations or buildings/office space, any type of supply or manufacturing material, physical equipment items, etc.). Human resource information can include attribute information defining one or more of any of the following: type attributes (e.g., full-time employee, part-time employee, contractor, temp, etc.), role attributes (e.g., project manager, architect, analyst, QA engineer, database manager/administrator, computer programmer), role-level attributes (e.g., a principal role, a senior role, an entry-level role, a graduate role, etc.), skill attributes (e.g., Java, C++, or generally any knowledge/ability to undertake a required activity), geographic attributes (e.g., one or more cities/countries or other locations where person is available to work), education attributes (e.g., Ph.D., M.B.A., J.D., etc.), language attributes (e.g., French, German, etc.), cost attributes (e.g., $/hour), experience attributes (e.g., years of experience working on regulatory compliance), fungibility, human fragmentation attributes (e.g., the capability to be assigned to multiple tasks), security attributes (e.g., security clearance, etc.), criticality attributes (e.g., a measure of the importance of a human resource), and/or any combination thereof.

Physical resource information can include attribute information defining one or more of any of the following: geographic attributes (e.g., one or more locations where physical resource can be used or accessed), cost attributes (e.g., cost to use per hour, cost of supply per unit, etc.), availability attributes (e.g., information indicating times/dates and/or locations that the resource is available for use and not assigned to other projects or due for maintenance), supply attributes (e.g., amount of supply), throughput attributes (e.g., network bandwidth, system capacity, physical space, etc.), security attributes, and/or any combination thereof. In some embodiments, the plurality of resources represented by the resource information can include both human personnel and physical resources in any combination thereof.

As an example, resource information is illustrated by the web page project discussed above, which includes human personnel (e.g., an HTML programmer) and physical resources (e.g., a computer) to successful complete the web page project. In some embodiments, resource information defines a minimum or maximum number of resources used for a project (e.g., at least eight Java programmers or at least one hundred hours of time on a supercomputer mainframe). Resource information can also specify a minimum level of experience, certification, and/or security clearance employed for a project (e.g., a certified public accountant with at least five years experience). Aside from resource information that specifies general resource consumption, resource information can also specify a specific resource used (e.g., the name of a particular person or physical resource).

Schedule information can include a start-date, an end-date (e.g., regulatory deadlines), one or more milestone dates, a time period, and/or any combination thereof associated with completion of a project. For example, the web page project described above can be constrained by a regulation requirement for a business to post certain information online by a certain date, in which case both the end date and the regulation requirement can be included in the schedule information. In some embodiments, schedule information can include certain dependencies, such that the completion of one project was dependent on the completion of any date or event associated with another project.

Cost information specifies the amount of money (e.g., spent on resources) consumed by a project. Profitability information specifies the profit earned by the project. Criticality information indicates a priority level of a project.

The prediction system 500 can store the historical performance information related to completed projects in one or more databases. The performance information can be gathered over a period time from various groups in a corporation. The prediction system 500 can use such historical performance information to construct a model (step 120) of the data domain, which can be used to estimate the probability of success of a new or in-flight project. In some embodiments, the prediction system 500 develops the model (step 120) using a probabilistic graphical modeling (PGM) approach by inferring, from the data collected and/or inputs from experts, certain variables and the relationships among the variables. These variables and their relationships are determined to achieve certain goals, such to predict the success of a project. For example, the prediction system 500 can generate a Bayesian network that includes a set of interconnected nodes, where each node represents a random variable in the model and the connecting arcs of the network represent causal relationships among the variables. Each node can assume one of a number of possible values to indicate a particular state of the variable. The probability that a certain state of a node occurs is determined from the probabilities associated with states of one or more nodes connected to the current node. Even though a Bayesian network is used to illustrate the principles of the present invention, other PGM modeling approaches are equally usable within the scope of the present invention, such as a Markov rule-based approach, neural network approach or genetic approach.

Figure 2:
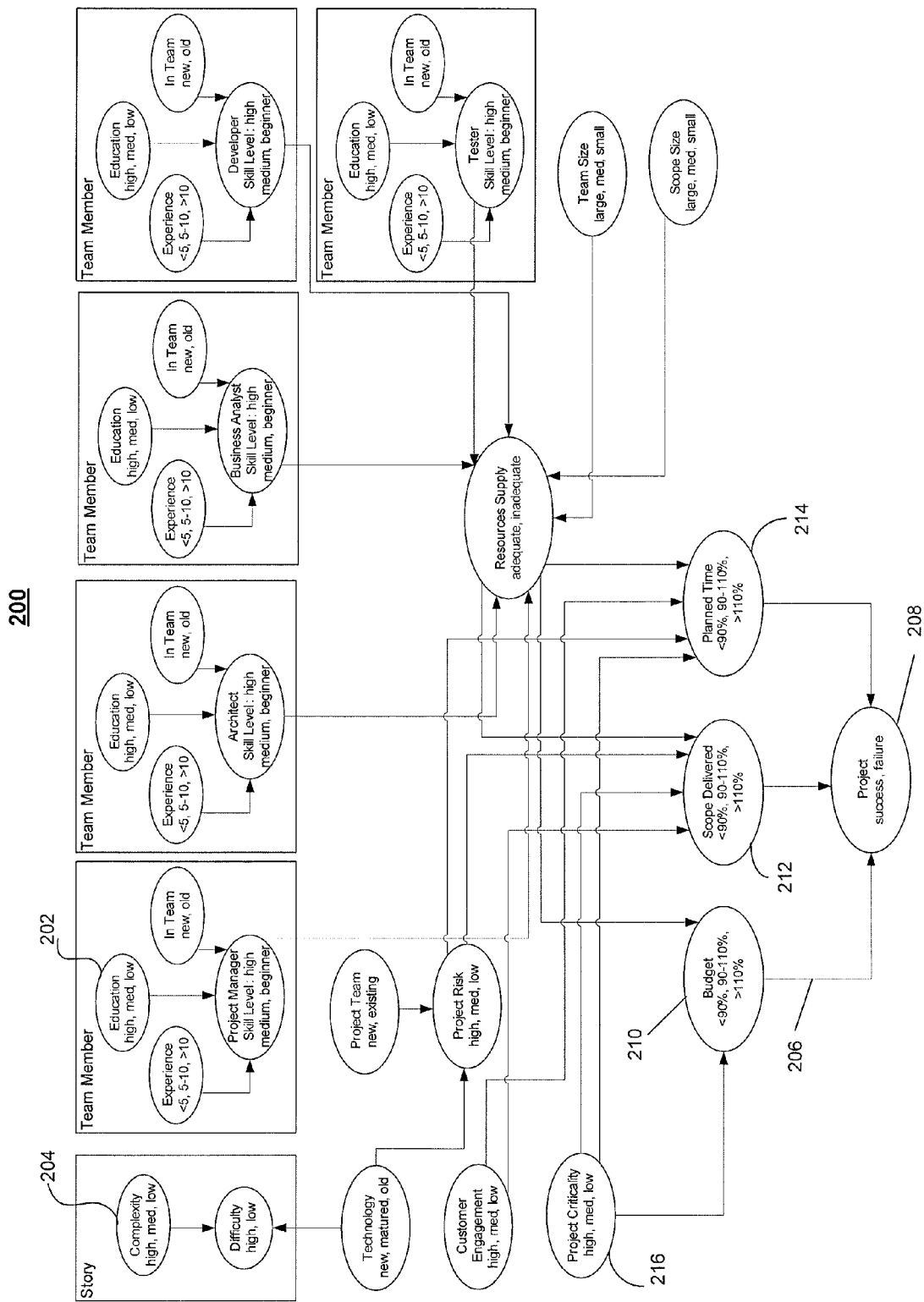
FIG. 2 shows an exemplary probabilistic graphical model generated using the process of FIG. 1 to predict the success of a project.

FIG. 2 shows an exemplary probabilistic graphical model 200 generated using flowchart 100 of FIG. 1 to predict the success of a project. Each node of model 200 represents a random variable and can take on a certain value corresponding to a particular state of the random variable. For example, the education variable 202 represents the education level of a specific worker or a group of workers and can assume a value indicating that the worker or worker group has a high level, medium level or low level of education. As another example, the complexity variable 204 represents the complexity of a task defined for the project and can assume a value indicating that the task has high complexity, medium complexity or low complexity. Each arc represents a causal relationship between two variables. For example, the arc 206 between the project success variable 208 and the budget variable 210 indicates that the funding level of a project has a causal effect on the success of the project represented by the project variable 208. Conversely, the project variable 208 is directly influence not only by the budget variable 210, but also by the scope variable 212 representing the number/type of tasks executed by the project and the planned time variable 214 representing the time allotted for completing the project, each of which is directly affected by one or more additional variables. As shown in FIG. 2, the model can be hierarchical, including several layers of causal relationships.

Figure 3:
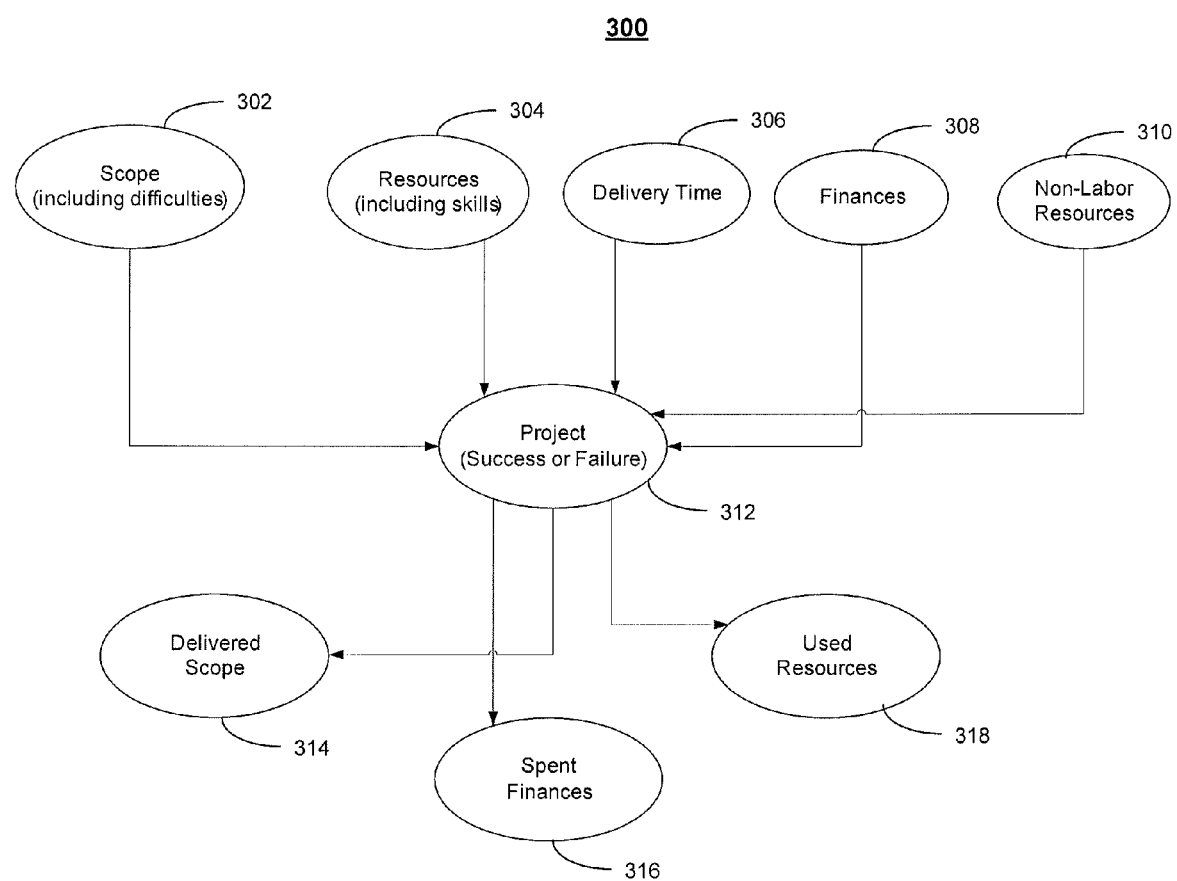
FIG. 3 shows another exemplary probabilistic graphical model generated using the process of FIG. 1 to predict the success of a project.

FIG. 3 shows another exemplary probabilistic graphical model 300 generated using flowchart 100 of FIG. 1 to predict the success of a project. The model 300 includes at least a scope variable 302 representing, for example, the scope and type of a task planned for a project (e.g., task complexity), a resource variable 304 representing, for example, a skill level of a human resource available to complete the project, a delivery time variable 306 representing, for example, a time limitation for completing the project, a finances variable 308 representing, for example, the cost allocated to complete the project and a non-labor resource variable 310 representing, for example, a non-labor related resource allocated for completing the project. These variables all have a causal effect on the project variable 312, which represents the likelihood of success of a project. The project variable 312 can in turn influence the state of one or more other variables, such as a delivered scope variable 314, a spend finances variable 316 and a used resources variable 318. The delivered scope variable 314 can indicate the scope of the project delivered and can assume one of three states—partial scope, full scope or extended scope. The spend finances variable 316 can indicate the amount of finances spent on the project and can assume three states—under budget, on budget or over budget. The used resources variable 318 can indicate the amount of resources consumed by the project and can assume three states—partial utilization, full utilization or over utilization.

With continued reference to FIG. 1, to construct a model with the goal of predicting the success of a project, such as model 200 of FIG. 2 and model 300 of FIG. 3, the prediction system 500 first identifies relevant variables for achieving this goal (step 122). After selecting the variables, the prediction system 500 determines the dependencies among the variables (step 124), such as which variable(s) has a causal effect on another variable. The selection of the variables and determination of the causal relationships among the variables can be accomplished by experts relying on their institutional knowledge and/or by the prediction system 500 based on the historical project performance data (step 110). In some embodiments, a few variables are initially selected for inclusion in the model and, depending on how well they predict project success, one or more variables and/or dependencies can be altered, added or removed. This iterative process can be repeated over time to fine tune the model structure, such as whenever the historical performance data is updated.

Once variables are selected and their relationships established, the prediction system 500 can use the historical project performance data to estimate a probability distribution corresponding to each variable (step 126). In some embodiments, a probability distribution for a variable can be a discrete function, formed as a series of probabilities corresponding to different states of each variable. Using the complexity variable 204 as an example, which is associated with three states—high complexity, medium complexity and low complexity, a probability distribution for the task variable 204 can include three probabilities corresponding to the three states, each probability indicates the likelihood of occurrence of the corresponding state. In addition, probability distributions can be generally divided into two groups, conditional probability distributions and unconditional probability distributions. Unconditional probability distributions are associated with those variables in a model that are conditionally independent on another variable. Hence, the probability that a state occurs for each of those variables is not contingent on any prior or related results. For example, in FIG. 2, the probability of occurrence of a high, medium or low complexity level of the complexity variable 204 is an unconditional probability. Similarly, the probability of occurrence of a high, medium or low educational level of the education variable 202 is an unconditional probability. In some embodiments, to estimate the unconditional probability of a state of a variable, the prediction system 500 can divide the sum of the total number times that particular state associated with the variable has occurred in the historical performance data by the total number of occurrences of the variable in the historical performance data, regardless of its state. For example, if the budget of 100 projects was tracked and 20 of these projects were completed below budget, then the unconditional probability of the below-budget state for the budget variable 210 is 0.2. Generally, the following equation can be used to calculate an unconditional probability of the ith state of variable A:

$$P(A_i) = \frac{\text{number of times } A_i \text{ occurs}}{\text{number of occurrences of all states of } A}. \quad \text{(Equation 1)}$$

Conditional probability distributions are associated with those variables in a model that are conditionally dependent on another variable. Hence, the probability that a state occurs for each of those variables is dependent on at least one other variable. For example, in FIG. 2, the probability of a project succeeds or fails, as represented by the project variable 208, is conditionally dependent on at least the budget variable 210, the scope delivered variable 212 and/or the planned time variable 215. In some embodiments, to determine the conditional probability of the ith state of variable A ($A_i$) given the occurrence of the jth state of variable B ($B_j$), the following equation can be used:

$$P(A_i | B_j) = \frac{P(A_i, B_j)}{P(B_j)}. \quad \text{(Equation 2)}$$

After a model is established, which includes one or more probability distributions characterizing various relationships in the model, the prediction system 500 can then determine, for a new project, a probability of success of the project that is subjected to one or more constraints (step 130). These constraints can specify that a certain state associated with at least one variable must be satisfied by the new project (e.g., the education level of a team member on the project must be high). As an example, given a model having variable A conditionally dependent on variables B and C, the prediction system 500 can use Equation 3 below to determine the probability of a state of variable A ($A_i$) occurring (e.g., the probability that the project variable assumes a success state), given that a state associated with variable B ($B_j$) needs to be satisfied (e.g., the education variable must be high), assuming that the state of variable C (e.g., the task complexity variable) is not specified.

$$P(A_i | B_j) = \sum_{l=1}^{m} P(A_i | B_j, C_l) * P(C_l). \quad \text{Equation 3}$$

In Equation 3, m represents the total number of states for variable C, $P(A_i|B_j, C_l)$ represents the probability of state $A_i$ constrained by state $B_j$ given the state $C_l$, and $P(C_l)$ represents the probability of $C_l$ occurring. In generally, Equation 3 can be extrapolated for use with other models having different variables and/or dependencies to determine the probability of success of a project.

FIG. 4 shows an example for predicting the success of a project using the process flow of FIG. 1. First, the prediction system 500 can determine a model, such as model 400, for predicting project success (step 120), where the model is created based on at least historical project performance data maintained in one or more databases (step 110). As shown by model 400 of FIG. 4, two variables, the budget variable 402 and the time variable 404, can have causal effects on the project variable 406. The budget variable 402 has three states: below-budget state, on-target state and above target state. The time variable 404 also has three states: early-delivery state, on-target delivery state, and late-delivery state. Next, the prediction system 500 can determine a probability distribution for each variable (step 126). Because the budget variable 402 and the time variable 404 are not influenced by another variable, they have unconditional probability distributions. Hence, for each of the variables, Equation 1 can be used to determine a probability distribution based on the historical performance data. For example, by separately counting the number of historical projects that have been completed below budget, on target and above budget, the probabilities associated with the below-budget state, on-target state and above target state of the budget variable 402 can be 0.2, 0.6 and 0.2, respectively. As another example, by separately tracking the number of historical projects that have been delivered early, on time and late, the probabilities associated with the early-delivery state, on-target-delivery state, and late-delivery state of the time variable 404 can be 0.1, 0.5, and 0.4, respective.

In contrast, the project variable 406 has a conditional probability distribution since it is conditionally dependent on both the budget variable 402 and the time variable 404. In some embodiments, the prediction system 500 can use Equation 2 to compute the probability distribution of the project variable 406, including the probability of the success state and that of the failure state. Table 450 shows an exemplary set of conditional probabilities for model 400, which lists probabilities of success or failure of a project depending on various combinations of states of the budget variable 402 and the time variable 404. For example, the probability that a project succeeds given that the project is below budget and delivered early is 0.9 (row 450a). Similarly, the probability that a project fails given that the project is below budget and delivered early is 0.1 (row 450b).

Using the model 400 and the conditional probabilities 450, the prediction system 500 can estimate the probability of success of a new project subjected to certain constraints. For example, given a new project that needs to be finished below budget, the prediction system 500 can estimate the probability of success of the project. Specifically, based on Equation 3, the probability can be calculated as follows:

P(p=success|b=below)=P(p=success|B=below,
t=early)*P(t=early)+P(p=success|B=below,
t=on_tgt)*P(t=on_tgt)+P(p=success|B=below,
t=late)*P(t=late)=0.94.1+0.6*0.5+0.3*0.4=0.51

Hence, for the example of FIG. 4, the probability of project success if the project is below budget is 0.51. The various values used to determine this probability can be found in table 450. While the example of FIG. 4 is fairly simple, the same principle can be used to determine the success of a project influenced by hundreds of variables with complex relationships among the variables.

Figure 5A:
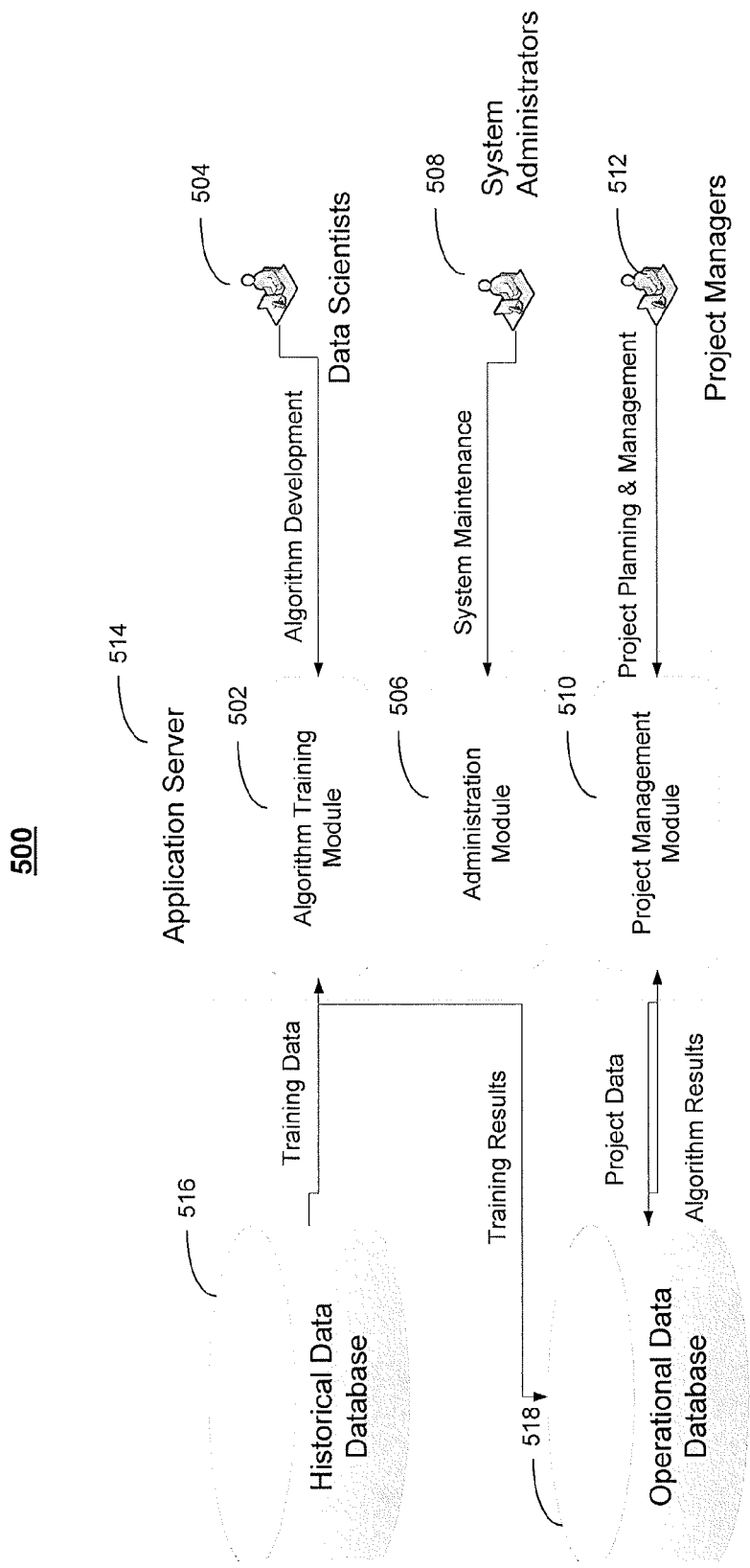
FIGS. 5A and B show a block diagram illustrating an exemplary design of a prediction system.
Figure 5B:
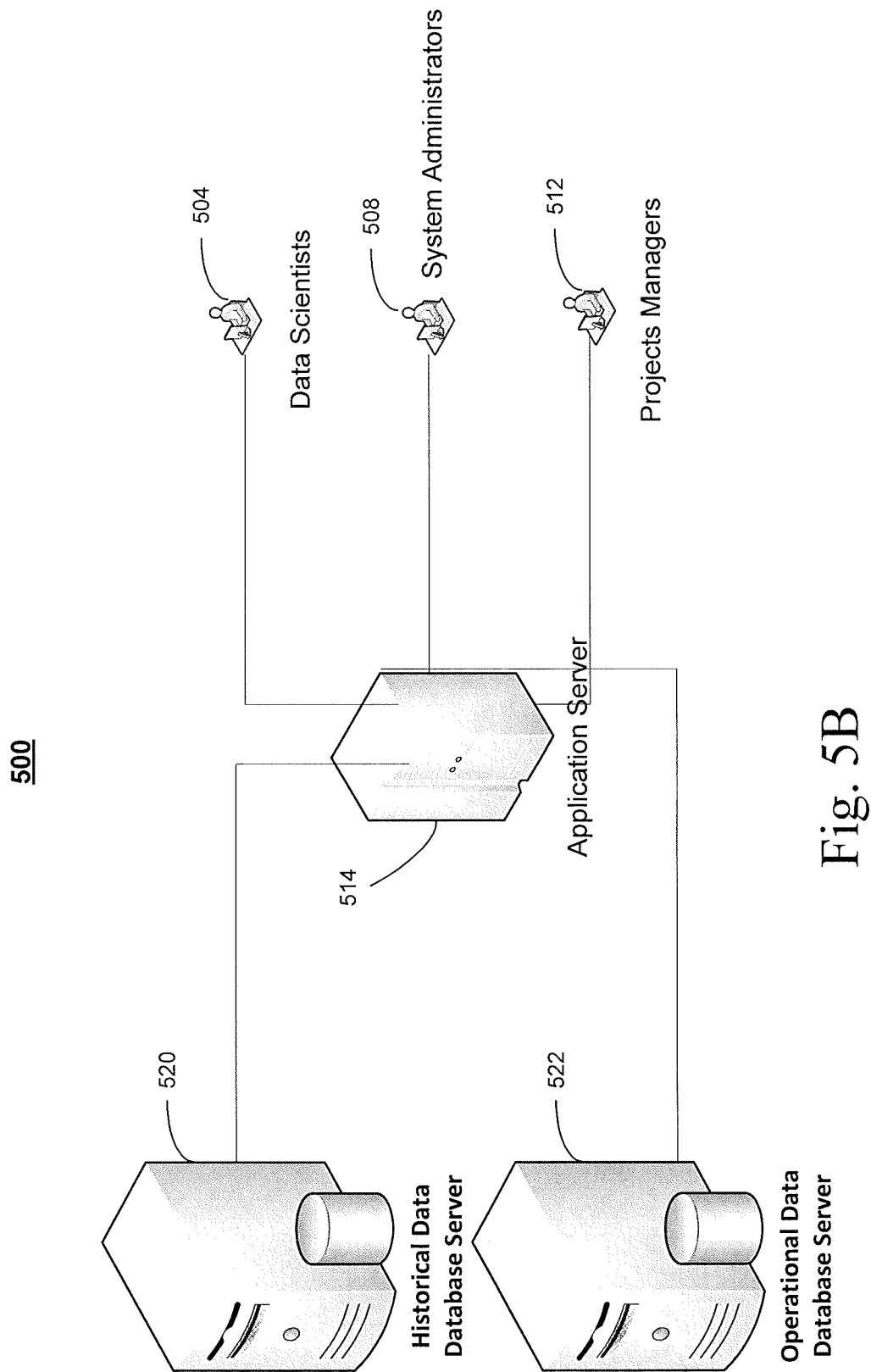

FIGS. 5A and B show a block diagram illustrating an exemplary design of a prediction system 500. The prediction system 500 includes a combination of processes and software modules to implement the functions described in flowchart 100 of FIG. 1. The prediction system 500 can provide various interfaces to allow a user to define parameters for the system. As shown, the prediction system 500 includes an algorithm training module 502 accessible to a data scientist 504, an administration module 506 accessible to a system administrator 508, and a project management module 510 accessible to a project manager 512. These modules can reside on one or more application servers 514, which can communicate with a historical data database 516 and an operational data database 518. In some embodiments, the databases 516 and 518 reside on different servers 520 and 522, respectively, as shown in FIG. 5B. In other embodiments, the databases 516 and 518 reside on the same server (not shown). Users of the prediction system 500, including the data scientists 504, the system administrators 508 and the project managers 512, can access the application server 514 and/or the database servers 522 and 522 via an IP network using one or more user devices. In some embodiments, a user device includes a display area for displaying online content and an input means for allowing a user to control online content presentation. The user device can be a home computer or a mobile device, such as an iPad or an iPhone, for example.

The administration module 506 allows a user, such as a system administrator 508, to manage user access (e.g., login and/or logout), user administration (e.g., any of the administration functions associated with the support and/or management of the system), widget management (e.g., providing the end user with the capability to arrange and save preferences for display of data within the browser area), and/or other graphical user interface (GUI) services.

The algorithm training module 502 allows a user, such a data scientist 504, to specify parameters for constructing one or more models to predict project success. The algorithm training module 502 can accomplish this by training data related to completed projects that are stored in the historical data database 516. In some embodiments, the algorithm training module 502 can store the generated models (i.e., training results) in the operational data database 518. Each model includes a plurality of variables, dependencies among the variables and probability distributions corresponding to the variables. Exemplary training algorithms are described above with reference to FIGS. 1-4 and Equations 1-3. For example, the algorithm training module 502 can generate models 200, 300 and 400 of FIGS. 2, 3 and 4, respectively, for predicting project success.

The project management module 506 allows a user, such as a project manager 508, to provide data related to one or more projects. In some embodiments, the data relates to a new or in-flight project that requires prediction of a probability of success, in which case the data is stored by the project management module 506 in the operational data database 518. The project management module 510 can also retrieve a model from the operational data database 518 to compute the probability of success of the project. In some embodiments, a project manager 512 can supply data related to a completed project, in which case the project management module 510 can store the data in the historical data database 516. Such historical data can be used by the algorithm training module 502 to construct a new model or update an existing model for predicting project success.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components. The above described techniques can be implemented as a Software-As-A-Service (SaaS) model or using a multi-tiered approach.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a world wide web browser (e.g., Microsoft® Internet Explorer® available from Microsoft Corporation, Mozilla® Firefox available from Mozilla Corporation).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A computer-implemented method for calculating a probability of project success for a new project, the method comprising:

maintaining, by a computing device, a database of historical project management performance data including i) project information associated with at least one completed project and ii) member information associated with at least one team member;

forming, by the computing device, a predictive probabilistic graphical model, wherein forming the predictive probabilistic graphical model comprises:

receiving, by the computing device, user inputs specifying a plurality of variables and conditional dependency relationships among the plurality of variables, wherein the plurality of variables include: (i) at least one conditionally independent variable, and (ii) at least one conditionally dependent variable that is dependent on the at least one conditionally independent variable, the at least one conditionally dependent variable comprising a success variable representing a probability of project success; and calculating, by the computing device, a probability distribution for each of the plurality of variables to characterize one or more of the conditional dependency relationships, wherein each probability distribution includes at least one probability corresponding to a state of the variable determined based on the historical project management performance data;

calculating, by the computing device, the probability of project success of the new project by defining the at least one conditionally independent variable of the predictive probabilistic graphical model and solving the success variable in the context of the predictive probabilistic graphical model; and refining, by the computing device, the predictive probabilistic graphical model using additional historical project management performance data by altering at least one of the plurality of variables, conditional dependency relationships or conditional distributions.

2. The computer-implemented method of claim 1, further comprising determining, by the computing device, a value defining at least one of the plurality of variables from information received from a user related to the new project.

3. The computer-implemented method of claim 2, wherein the probability of project success is calculated subject to the value defined for the at least one variable.

4. The computer-implemented method of claim 1, wherein the member information includes at least one of an education level, experience level or skill level of the at least one team member.

5. The computer-implemented method of claim 1, wherein the task information comprises a complexity level of the at least one completed task.

6. The computer-implemented method of claim 1, wherein the plurality of variables include a scope variable representing a scope of tasks executable in a project, a resource variable representing an amount of resources available to a project, a delivery time variable representing a time limit for completing a project, a finances variable representing an amount of financial resources available to a project, and a non-labor resource variable representing an amount of non-labor resources available to a project.

7. The computer-implemented method of claim 6, wherein the variable presenting a probability of project success is conditionally dependent on at least one of the scope, resource, delivery time, finances or non-labor resource variable.

8. The computer-implemented method of claim 1, wherein the predictive model is generated using the probabilistic graphical modeling technique comprising one of a Bayesian algorithm, Markov rule-based algorithm, neural network algorithm, or genetic algorithm.

9. A computer program product, tangibly embodied in a non-transitory machine-readable storage device, for calculating a probability of project success for a new project, the computer program product including instructions being operable to cause data processing apparatus to:

maintain a database of historical project management performance data including i) project information associated with at least one completed project and ii) member information associated with at least one team member;

form a predictive probabilistic graphical model, wherein the instructions that cause the data processing apparatus to form the predictive probabilistic graphical model comprise instructions that cause the data processing apparatus to:
  receive user inputs specifying a plurality of variables and conditional dependency relationships among the plurality of variables, wherein the plurality of variables include: (i) at least one conditionally independent variable, and (ii) at least one conditionally dependent variable that is dependent on the at least one conditionally independent variable, the at least one conditionally dependent variable comprising a success variable representing a probability of project success; and
  calculate, for each of the plurality of variables, a probability distribution to characterize one or more of the conditional dependency relationships, wherein each probability distribution includes at least one probability associated with a state of the variable determined based on the historical project management performance data;
calculate the probability of project success of the new project by defining the at least one conditionally independent variable of the predictive probabilistic graphical model and solving the success variable in the context of the predictive probabilistic graphical model; and
refine the predictive probabilistic graphical model using additional historical project management performance data by altering at least one of the plurality of variables, conditional dependency relationships or conditional distributions.

10. The computer program product of claim 9, wherein the member information includes at least one of an education level, experience level or skill level of the at least one team member.

11. The computer program product of claim 9, wherein the task information comprises a complexity level of the at least one completed task.

12. The computer program product of claim 9, wherein the plurality of variables include a scope variable representing a scope of tasks executable in a project, a resource variable representing an amount of resources available to a project, a delivery time variable representing a time limit for completing a project, a funding variable representing an amount of financial resources available to a project, and a non-labor resource variable representing an amount of non-labor resources available to a project.

* * * * *